Figure 1:
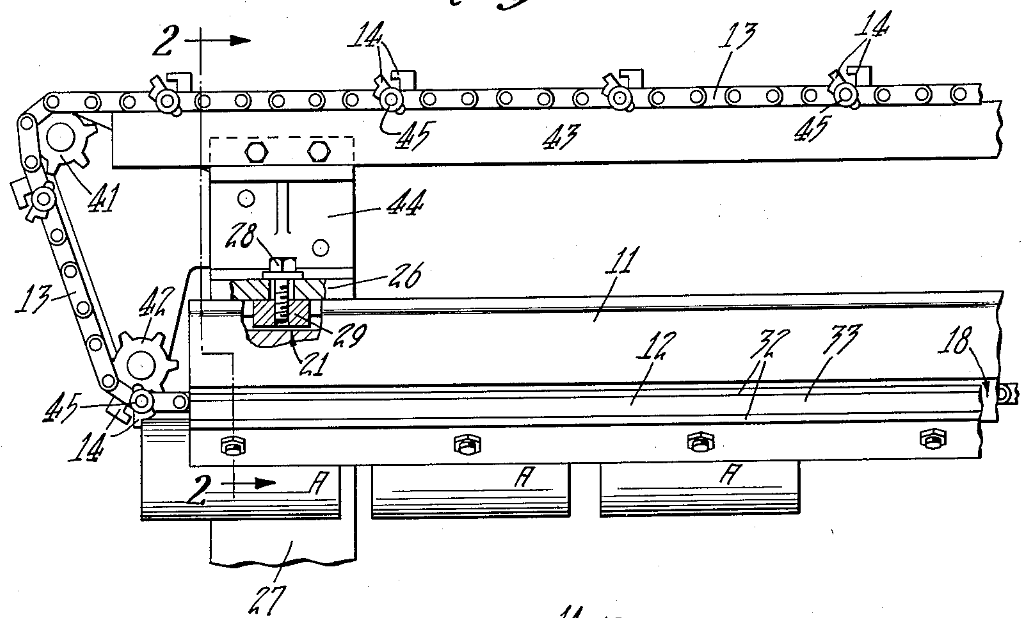

Jan. 17, 1956 J. E. SOCKE 2,731,133

CAN BODY MAKING MACHINE WITH IMPROVED BODY SUPPORT MEMBER

Filed Aug. 26, 1952

INVENTOR.
JOHN E. SOCKE
BY Charles H. Esne
Leland R. McCann
George W. Reifer
ATTORNEYS United States Patent Office 2,731,133

Patented Jan. 17, 1956

2,731,133

CAN BODY MAKING MACHINE WITH IMPROVED BODY SUPPORT MEMBER

John E. Socke, Pelham Manor, N. Y., assignor to American Can Company, New York, N. Y., a corporation of New Jersey Application August 26, 1952, Serial No. 306,418

5 Claims. (Cl. 198—41)

The present invention relates to a can body making machine having a conveyor for advancing can bodies in processional, spaced and endwise relation for treatment and has particular reference to an extruded support member of light soft metal for accommodating the conveyor and its auxiliary parts. This is a companion application to my copending United States applications Serial Number 306,415, filed August 26, 1952, for Can Body Support With Conveyor Wearing Tracks, Serial No. 306,416, filed August 26, 1952, for Can Body Support Aligning Device, and to Lloyd H. Weber, Serial No. 360,335, filed August 26, 1952, for Can Body Support With Adjustable Rails.

In the manufacture of sheet metal cans or containers, the operations of forming the bodies of the cans usually are effected while the partially formed can bodies are advanced along a path of travel by a conveyor and while supported on a horn or mandrel or other support member. In some cases the can bodies may be supported on an inside support with the bodies wrapped around the outside of the support. In other cases the support may be disposed outside of the bodies, in which case can supporting rails attached to a support member may be used. In either case, the conveyor usually is disposed in the support member and the member secured to the frame of the machine.

Recently it has been discovered that an extruded support member, preferably made of soft, light materials, such as aluminum, aluminum alloys, magnesium, etc. which can be readily extruded from a die, is much superior in many ways to support members made of relatively harder materials such as iron or steel. However such soft material is not suitable for the inclusion therein of threaded bolt holes since threads readily wear or crumble away when used frequently or when subjected to bolt tightening pressures.

Numerous advantages including economy however make the extruded support member highly desirable. When made of aluminum or extrudable aluminum alloy metals it is extremely light in weight yet of sufficient rigidity and strength to be desirable for use in a can body making machine. As contradistinguished from a hard metal non-extrudable support member, the extruded support member is completely finished when extruded, no machining or refinishing of surfaces or cutting of grooves or recesses being necessary since these are all effected in the extruding operation. Another advantage is the accuracy and straightness with which such an extruded support member may be made, regardless of the length of the member. Some of these support member run to 25 and 30 feet in length and yet in extruded support members longitudinal recesses or grooves are straight and accurately aligned, while contour faces and other structural details are readily maintained to desired dimensions.

An object, therefore, of the invention is the provision in a can body making machine of a can body support member wherein the support member comprises an integral unitary structure of an extrudable material, so that an accurately formed contour and accurately located and formed recesses in the member may be obtained without further machining or refinishing of the member or any of its portions.

Numerous other objects and advantages of the invention will be apparent as it is better understood from the following description, which, taken in connection with the accompanying drawings, discloses a preferred embodiment thereof.

Figure 2:
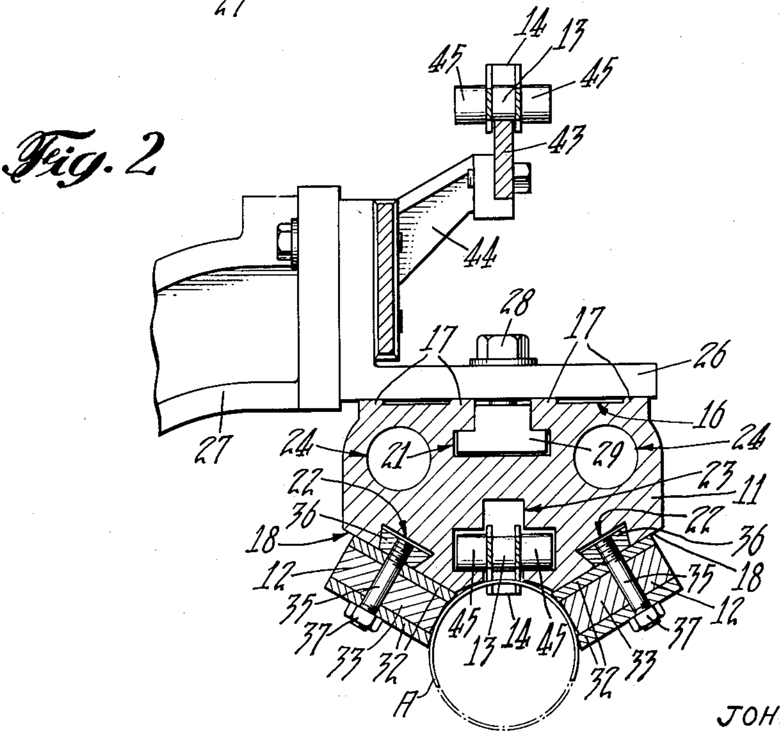

Referring to the drawings:

Figure 1 is a fragmentary side elevation of principal parts of a can body making machine embodying the instant invention, and Fig. 2 is an enlarged transverse sectional view taken substantially along the broken line 2—2 in Fig. 1, with parts broken away.

As a preferred or exemplary embodiment of the invention the drawings illustrate principal parts of a can body side seam soldering machine of the character disclosed in United States Patent 1,338,716 issued May 4, 1920, to Magnus E. Widell on Soldering Machine. In such a machine the can bodies to be treated are propelled along a straight line path of travel in a substantially continuous procession and in end-to-end spaced and timed relation, the can bodies being supported in an outside horn or mandrel for the various operations performed on them.

The drawings show an improved horn or mandrel unit which comprises a one-piece extruded horn or support member 11 and a pair of magnetic rails 12 for supporting by attraction, cylindrical sheet metal can bodies A which are propelled along the rails 12 for treatment by an endless chain conveyor 13 having spaced gripper dogs 14.

The extruded support member 11 preferably is made of aluminum, an aluminum alloy, magnesium, etc. which can be readily extruded from a die. The member 11 is straight and extends longitudinally of the machine for its entire length. As extruded, the support member 11 is provided with a flat top face 16 (Fig. 2) having a plurality of spaced and parallel longitudinal ribs 17 for attaching the member to the machine, and a pair of inclined or tapered faces 18 which converge towards each other at the bottom of the member for receiving the magnetic rails 12. The support member 11, as extruded is also formed with a longtiudinal T-slot 21 disposed adjacent its top face 16 for holding the member in place, a pair of longitudinal dovetail grooves 22 disposed one adjacent each of the tapered faces 18 for holding the magnetic rails 12 in place, a longitudinal slot or track 23 of cruciform cross-section disposed at the bottom of the member between the tapered faces 18 for the conveyor 13, and a pair of longitudinal channels or conduits 24 through which a fluid cooling medium may be circulated for cooling the member if desired. With such a contour and such receses provided in the member during the extrusion thereof, no further machining or refinishing of the member is required and no threaded holes need be added since none are necessary. For these reasons the extruded member is highly economical to manufacture and maintain.

In the machine, the support member 11 is suspended from a plurality of spaced angle brackets 26 in turn secured to arms 27 which extend up from the frame of the machine at spaced intervals along its length. The support member 11 preferably is held in place, with the ribs 17 on the top face 16 of the member clamped against the bottom surface of the angle brackets 26, by bolts 28 which extend through holes in the angle brackets 26 and which are threadedly engaged in T-shaped blocks 29 disposed in the T-slot 21 in the top of the support member. The blocks 29 may be made of steel or the like material which will withstand sufficient pressure on the screw threads therein to tightly hold the support member 11 in place. Thus no screw threads are required in the extruded soft metal support member for this purpose.

The magnetic rails 12 extend longitudinally of the support member 11 for its entire length. Each of these rails preferably comprises a pair of spaced and parallel magnetic pole plates 32 with a non-magnetic core plate 33 disposed between them and secured together to provide a unitary structure. These rails may be permanently magnetized or electrically magnetized, as desired. The rails 12 are located one against each tapered face 18 of the support member 11 as shown in Fig. 2 so as to radially engage by magnetic attraction and hold in suspension the can bodies A. The rails 12 are held in place by studs 35 (Fig. 2) which extend through registering clearance holes formed in the pole plates 32 and the core plates 33. The inner ends of the studs 35 are threadedly engaged in wedge-shaped clamp blocks 36 which are disposed in the dovetail grooves 22, while the outer ends of the studs 35 carry nuts 37 which are provided to tightly draw the clamp blocks 36 and the rails 12 together to clamp them against the tapered faces 18 of the support member 11. Thus no threaded holes are required in the soft metal support member itself and the member is protected against damage due to stripped threads.

The endless chain conveyor 13 which propels the can bodies A along the magnetic rails 12, operates over vertically spaced sprockets 41, 42 (Fig. 1) disposed at each end of the machine and is actuated in any suitable manner, preferably as shown in the above mentioned Widell patent. The upper run of the conveyor 13, intermediate the ends of the machine, rides on and is supported by a longitudinally disposed and stationary support bar 43 which is secured to small brackets 44 in turn attached to the angle brackets 26. The lower run of the conveyor 13 operates in the open slot or track 23 formed in the bottom of the support member 11. Rollers 45 secured to both sides of the conveyor adjacent the gripper dogs 14, ride on the lower horizontal legs of the track 23 and thus support the conveyor, while the gripper dogs 14 depend below the support member for engagement with and for propelling the can bodies along the rails 12.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can body making machine, the combination of an elongated one-piece extruded longitudinal support member of relatively soft metal, said support member being free of threaded holes and having a longitudinal extruded recess therein, a conveyor disposed in said recess for advancing along said support member a procession of can bodies arranged in spaced endwise relation, means carried by said support member for yieldably holding the can bodies advanced by said conveyor, and a second extruded longitudinal recess in said support member spaced from said first mentioned recess and having means therein for removably securing said support member to the machine frame at spaced localities along said second recess without the necessity for threaded holes in said support member.

2. In a can body making machine, the combination of an elongated one-piece extruded longitudinal support member of relatively soft metal such as aluminum, said support member being free of threaded holes and having a longitudinal extruded recess therein for receiving a movable conveyor and having supplementary extruded longitudinal recesses for securing can body support rails therein to eliminate the necessity for threaded bolt holes in said extruded support member, a plurality of rails disposed adjacent said supplementary recesses for supporting can bodies advancing in spaced endwise relation, means engaging in said supplementary recesses for removably attaching said rails to said support member, and a movable conveyor disposed in said conveyor recess in said support member for advancing said can bodies along said rails in processional order.

3. In a can body making machine, the combination of an elongated one-piece extruded longitudinal support member of relatively soft metal such as aluminum, said member being free of threaded holes and having an extruded longitudinal recess therein for the reception of a movable conveyor and also having a spaced supplementary extruded longitudinal recess therein to eliminate the necessity for threaded bolt holes in said extruded support member, a frame for supporting said longitudinal support member, means engaging in said supplementary recess for removably attaching said support member to said frame, a conveyor disposed in said conveyor recess for advancing a procession of can bodies along said longitudinal support member in spaced endwise relation, and means on said support member for maintaining the can bodies in position for advancement by said conveyor.

4. In a can body making machine, the combination of an elongated one-piece extruded longitudinal support member of relatively soft metal, said member being free of threaded holes and having an extruded recess extending the full length thereof for receiving a movable conveyor, said member also having a plurality of spaced longitudinally disposed supplementary recesses respectively for supporting said member and for the removable attachment of can body rails thereto, a frame for supporting said member, means engaging in one of said supplementary recesses for attaching said member to said frame, a plurality of can body rails disposed adjacent other of said supplementary recesses for supporting can bodies advancing in spaced and endwise relation along said support member, means engaging in other supplementary recesses for removably attaching said rails to said support member, and a conveyor disposed in said conveyor recess for advancing said can bodies along said rails and said support member in processional order.

5. In a can body making machine, the combination of an elongated one-piece extruded longitudinal support member of relatively soft metal, said member being free of threaded holes and having an extruded recess therein for receiving a movable conveyor, said member also having smoothly extruded tapered faces having supplementary extruded recesses therein, a plurality of rails disposed adjacent said tapered faces for supporting can bodies arranged in spaced and endwise relation, means engaging in said supplemental recesses for removably securing said rails in engagement with said tapered support member faces, and a conveyor movably disposed in said conveyor recess for advancing said can bodies along said support member and said rails in processional order.

References Cited in the file of this patent

UNITED STATES PATENTS

| | | |
|---|---|---|
| 925,883 | Eldridge | June 22, 1909 |
| 970,704 | Graham | Sept. 20, 1910 |
| 989,249 | Graham | Apr. 11, 1911 |
| 1,534,677 | Assmann | Apr. 21, 1925 |
| 1,956,344 | Coyle | Apr. 24, 1934 |
| 2,039,338 | Nordquist | May 5, 1936 |
| 2,091,804 | Cameron | Aug. 31, 1937 |
| 2,135,579 | Johnson | Nov. 8, 1938 |
| 2,348,495 | Peterson | May 9, 1944 |